United States Patent [19]

Hashimoto

[11] Patent Number: 4,656,655
[45] Date of Patent: Apr. 7, 1987

[54] REMOTE CONTROL ADAPTER OF ELECTRIC EQUIPMENT USING TELEPHONE LINES

[75] Inventor: Kazuo Hashimoto, Tokyo, Japan
[73] Assignee: Hashimoto Corporation, Tokyo, Japan
[21] Appl. No.: 790,647
[22] Filed: Oct. 23, 1985
[30] Foreign Application Priority Data Oct. 23, 1984 [JP] Japan ................. 59-222592

[51] Int. Cl.⁴ .......................................... H04M 11/06
[52] U.S. Cl. ..................................... 379/105; 360/69
[58] Field of Search ................ 179/2 A, 2 R; 360/69, 360/33.1, 137; 455/603

[56] References Cited

U.S. PATENT DOCUMENTS

| | | | |
|---|---|---|---|
| 4,121,053 | 10/1978 | Dick | 179/2 A |
| 4,442,319 | 4/1984 | Treidl | 179/2 A |
| 4,467,144 | 8/1984 | Wilkerson et al. | 179/2 A |
| 4,491,690 | 1/1985 | Daley | 179/2 A |
| 4,540,851 | 9/1985 | Hashimoto | 179/2 A |

OTHER PUBLICATIONS

"An Interactive Video Information Terminal" by Gordon IEEE Transactions on Communications vol. Com-31, No. 2, Feb. 1983.

*Primary Examiner*—James L. Dwyer
*Attorney, Agent, or Firm*—Lowe, Price, Leblanc, Becker & Shur

[57] ABSTRACT

In a remote control system of electric equipment, a remote control box which is to be incorporated with the electric equipment is adapted to the remote control adapter which accepts a telephone call and engages with the telephone line upon acceptance of a telephone call and receives many kinds of remote control signals through telephone line to control the remote box according to the tone decoder connected to microprocessing controlled switches.

8 Claims, 3 Drawing Figures

REMOTE CONTROL ADAPTER OF ELECTRIC EQUIPMENT USING TELEPHONE LINES

BACKGROUND OF THE INVENTION

The present invention relates to an electric equipment remote control adapter using telephone lines.

A conventional remote control means for controlling electric equipment such as a video tape recorder or a television set (to be referred to as a VCR or TV hereinafter) by using telephone lines has been previously disclosed by the present applicant in U.S. Pat. No. 4,540,851. However, to use such a remote control means, a VCR or TV proper should be modified for interface problem. It is therefore not practical to use such a remote control means to be incorporated with a home VCR which may be controlled by telephone line from outside.

SUMMARY OF THE INVENTION

It is a first object of the present invention to provide a remote control adapter for controlling conventional electric equipment, wherein operation of the remote control adapter is controlled through telephone lines without modifying the electric equipment itself under the consideration that most conventional electric equipment (VCR or TV) has a remote control accessory box which may have a plug-in type adapting construction.

It is a second object of the present invention to provide a remote control adapter for controlling electric equipment (VCR or TV) by using conventional pushphone, wherein selective push button operation by a calling party makes it possible to effect selective operation of a remote control box which controls the above electric equipment.

According to the present invention, there is provided a remote control adapter which comprises adapting means for conventional remote control box and engaging means for automatically engaging and disengaging the telephone line. A remote control signal sent through the telephone lines after engagement of the telephone line is decoded by a tone decoder to a code signal, and code signal switching means controls each of selective functions of the remote control box, thereby controlling the electric equipment. Thereafter, the calling party's hang-up state is detected by a disengaging means to disengage the telephone lines from the remote control adapter.

Therefore, an advantage of the present invention lies in the fact that the remote control box adapted in the remote control adapter for controlling a TV set or a VCR is remote controlled through the telephone lines without modifying the VCR or TV set. Electric equipment adapting the present invention can easily satisfy the needs for remote control through the telephone lines without modifications of the equipment, thus providing a great practical advantage.

DETAILED DESCRIPTION OF THE PREFERRED EMBODIMENT

A remote control adapter according to an embodiment of the present invention will be described with reference to the accompanying drawings.

Figure 1:
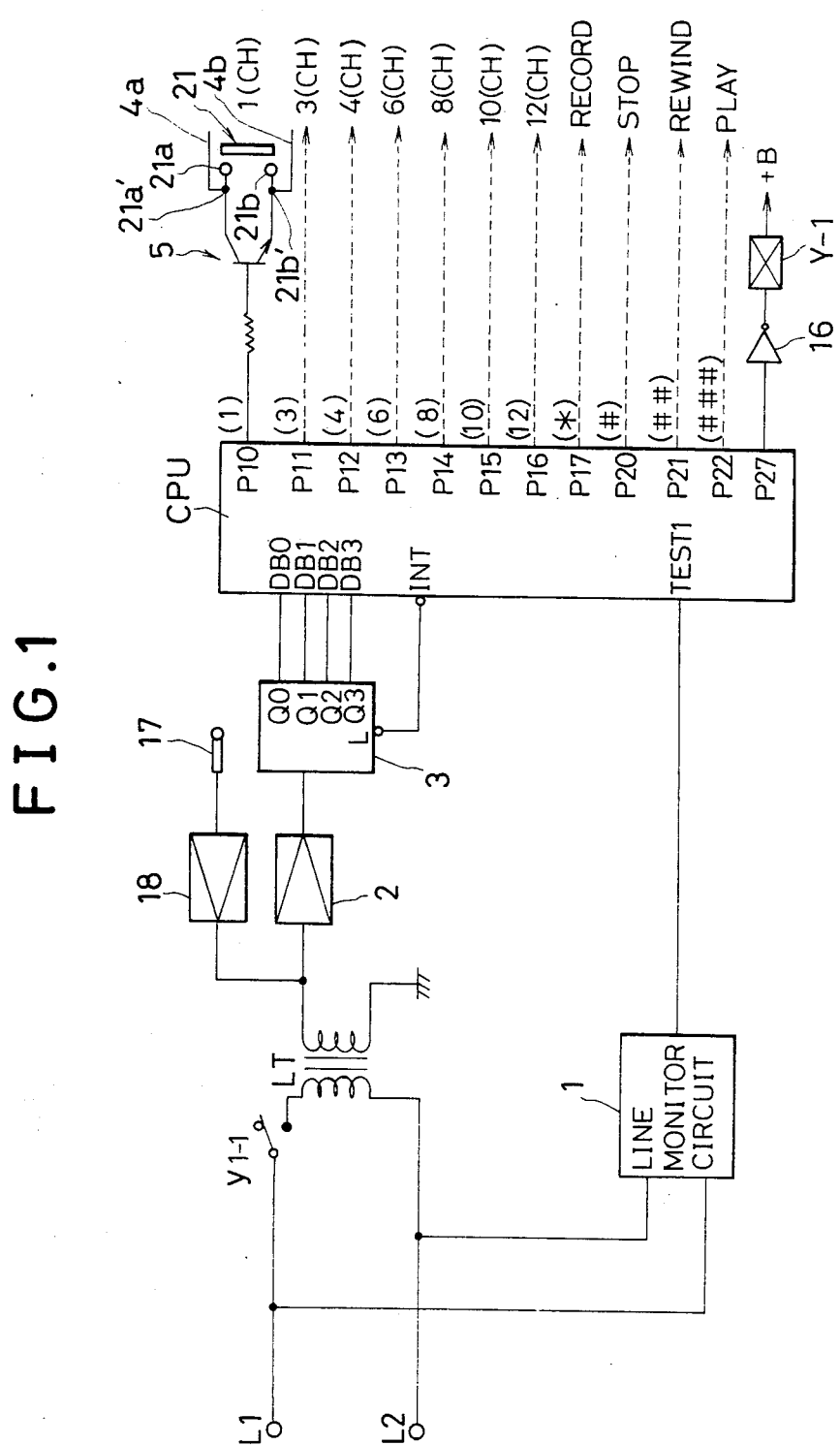
FIG. 1 is a circuit diagram showing the main part of the remote control adapter according to an embodiment of the present invention.
Figure 2:
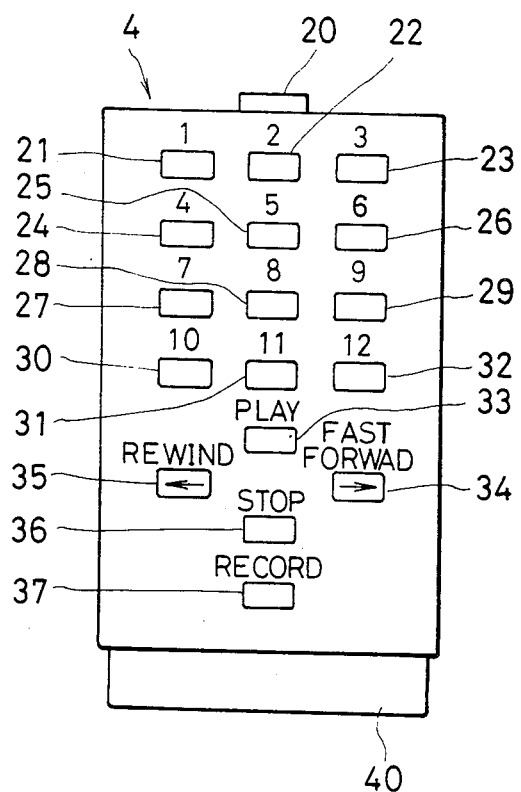
FIG. 2 is a plan view of a conventional remote control box to be incorporated with the adapter shown in FIG. 1.
Figure 3:
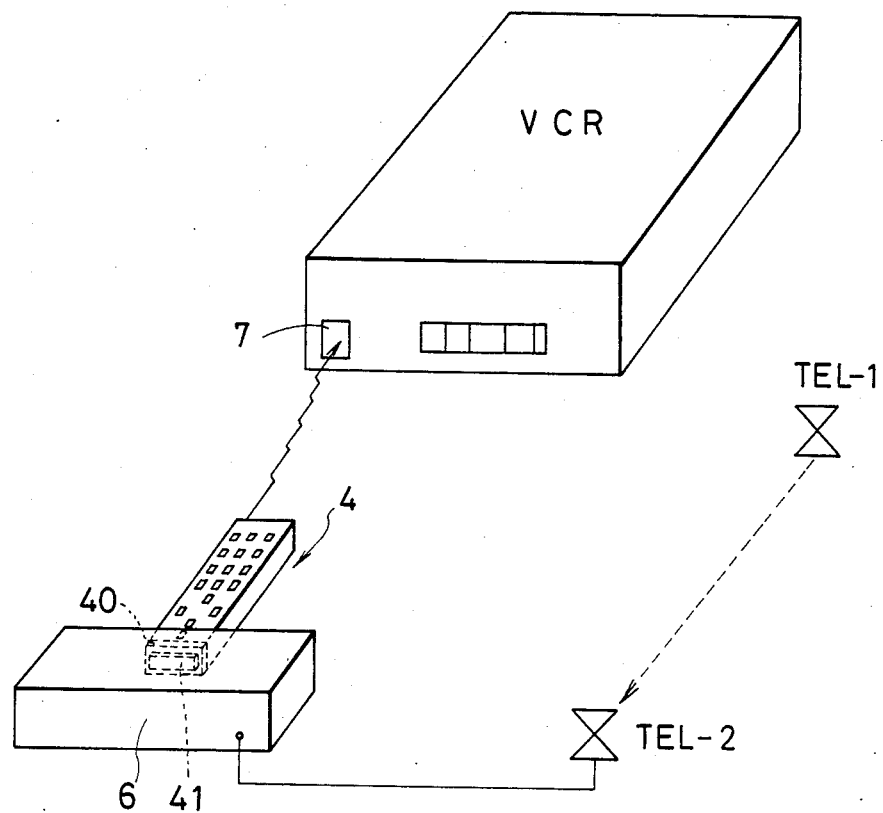
FIG. 3 is a perspective view showing a total system wherein the remote control adapter of FIG. 1 is being used.

Referring to FIG. 1, reference symbols L1 and L2 denote telephone lines, respectively; and LT, a line transformer. Reference numeral 1 denotes a line monitor circuit having both a ringing signal detection function and an on-hook detection function; 2, an amplifier for detecting a tone as a remote control signal sent from a pushphone of a calling party; and 3, a tone decoder for detecting the tone from the pushphone and converting it to a corresponding code signal. Reference symbol CPU denotes a microprocessor (to be referred to as a CPU hereinafter) as a control means. In this embodiment, the CPU comprises, for example, a CPU 8748 available from Intel Corp., U.S.A. Reference symbols DB0 to DB3 denote input ports, respectively; and P10 to P17 and P20 to P27, output ports, respectively. Reference numeral 5 denotes a switching transistor, the base of which is connected to the output port P10. The collector and emitter of the transistor 5 are respectively connected to terminals 21a and 21b of a 1CH (channel) selection pushbutton switch 21 on an infrared remote control box 4 of FIG. 2. The transistor 5 is turned on in response to the output from the output port P10, so that the terminal 21a is electrically connected to the terminal 21b. An infrared generator (not shown) in the remote control box 4 is connected to the terminals 21a and 21b of the 1CH selection button switch 21 through lead wires 4a and 4b. When the transistor 5 is turned on to operate the pushbutton switch 21, the infrared generator is started, so that a coded 1CH selection infrared ray is emitted from an infrared emission surface 20. Although the same arrangement for 1CH as described above is arranged for other channels and an illustration thereof is omitted, switching transistors are respectively arranged between both terminals of each of switches 22 to 32 for other channels and switches 33 to 37 for PLAY, FF (fast forward), REW (rewind), STOP and REC (record) pushbutton switches of a video tape recorder (to be referred to as a VCR hereinafter) as electric equipment. At the same time, the terminals of the switches 22 to 37 are connected to the infrared generator. Upon operation of the respective switching transistors and hence of the corresponding switches, coded infrared rays are emitted from the infrared emission surface 20. The switching transistors (only one transistor 5 is illustrated) are electrically connected to the pushbutton switches at contacts 21a' and 21b', (FIG. 1) by inserting the remote control box 4 into the remote control adapter 6 incorporating the line monitor circuit 1 and the microprocessor CPU, as shown in FIG. 3.

Reference symbol TEL-1 denotes a calling party's telephone set; and TEL-2, a telephone set connected to the remote control adapter 6 of this embodiment.

Reference numeral 16 denotes a driver. Reference symbol Y-1 denotes a looping relay with a contact y1-1. Reference numeral 17 denotes a plug jack inserted in an earphone jack of the VCR. The plug jack 17 is connected to the secondary coil of the line transformer LT through an amplifier 18 so as to allow the calling party to monitor a voice signal in the REC or PLAY mode of the VCR.

The operation of the remote control adapter 6 having the arrangement described above will be described hereinafter. The user or owner inserts the remote control box 4 into the adapter 6 and faces the infrared emission surface of the remote control box 4 to a light-receiving portion 7 (FIG. 3) of the VCR before he leaves home. Assume that the owner calls the remote control adapter 6 from an external pay telephone (pushphone). When the ringing signal is supplied to a test terminal TEST1 of the CPU through the line monitor circuit 1, the output port P27 is set at logic "1" in accordance with the program prestored in the CPU. The elements 1 and 16, the CPU and the relay Y-1 as an engaging means are held operative through the driver 16. The control program for this operation is known to those skilled in the art and a description thereof will be omitted. The telephone lines are engaged with the remote control adapter 6 through the contact y1-1 of the relay Y-1, thereby interrupting the ringing signal.

When the owner wishes to record a 1CH television program in the VCR, he depresses the "1" button in the pushphone. The "1" tone from the pushphone is detected by the tone decoder 3 through the line transformer LT and the amplifier 2. Bits Q0, Q1, Q2 and Q3 of an output from the 4-bit decoder 3 are set at logic "1", "0", "0" and "0", so that a corresponding code signal is set to be "1000". The code signal is fetched by the CPU through the input ports DB0 to DB3. In this case, a signal of logic "1" appears at the output port P10. The switching transistor 5 is turned on, and the terminals 21a and 21b of the 1CH switch 21 of the remote control box 4 (FIG. 2) and the lead wires 4a and 4b connected to the terminals 21a and 21b are electrically connected to each other. In this case, the infrared emission surface 2 of the accessory remote control box 4 of the VCR emits the coded infrared ray to select the 1CH (Channel 1). The coded infrared ray is received by the light-receiving portion 7 of the VCR, so that the VCR is set in the 1CH operation mode. The audio signal in the 1CH is sent onto the telephone lines through the plug 17 inserted in the earphone jack of the VCR, the amplifier 18 and the line transformer LT. Therefore, the calling party (i.e., the owner) can confirm that he selects the right channel. It should be noted that the output from the output port P10 is reset to logic "0" within 1 to 2 seconds in accordance with the control program. When the calling party depresses the asterisk (*) button, a tone signal therefrom is decoded by the tone decoder 3. The code signal corresponding to the tone signal causes the output port P17 of the CPU to be set at logic "1". The switching transistor (not shown) is connected to an REC button 37 of the remote control box 4 of FIG. 2. Therefore, the VCR starts recording for 1CH. The control program of the CPU is given such that predetermined pushbuttons (e.g., 1 and 0) are sequentially depressed within a predetermined period of time (1 to 2 seconds) for a two-digit channel (e.g., 10CH), that the "#" button is depressed once to stop the VCR, and that the REW and PLAY modes are set upon depression of the "#" button twice and three times, respectively.

When the calling party finishes the above remote control operation, he hangs up the phone. An on-hook signal is detected by the line monitor circuit 1. The CPU operated as the disengaging means together with the circuit 1 generates an output of logic "0" from the output port P27 for deenergizing the relay Y-1, thereby resetting the remote control adapter 6 in the standby mode. In this manner, the calling party can arbitrarily operate the remote control box 4 of the VCR through the remote control adapter by using the buttons of the pushphone. Furthermore, as disclosed in U.S. Pat. No. 4,540,851, a reservation timer function can be included in the remote control adapter to perform channel reservation operation.

The use of the remote control adapter will be described with reference to FIG. 3. Referring to FIG. 3, the remote control box 4 used as a separate unit in the conventional apparatus can be plugged into the remote control adapter 6. The connectors at the coupling portions of the remote control box 4 and the remote control adapter 6 must have a structure suitable for frequent detachment/attachment. One end of the remote control box 4 has a female or male structure 40, and the corresponding adapter side has a male or female structure 41. When the remote control box 4 is used as a unit separate from the remote control adapter 6 for indoor use, the remote control box 4 is detached from the remote control adapter 6 and is used in a conventional manner. When the user is going out, he simply couples the remote control box 4 to the remote control adapter 6. Then, he can call the telephone set TEL-2 from the telephone set TEL-1 and arbitrarily control at the telephone set TEL-1 the television set or the VCR connected to the telephone set TEL-2.

The above embodiment exemplifies the case wherein the accessory remote control box of the VCR is remote controlled from a pushphone to selectively perform REC, PLAY, STOP, REW and so on of the VCR for each channel. However, the present invention is not limited to the remote control adapter for the VCR, but can be extended to other remote control adapters for equivalent equipment.

What is claimed is:

1. A remote control adapter for interfacing a remote control unit for electric equipment with telephone lines, the control unit having a plurality of selection switches for selectively controlling said equipment, the adapter comprising:
   receiving means for supporting said remote control unit in a suitable direction for remote control of said electric equipment, said receiving means including means for controlling said selection switches;
   engaging means for automatically detecting a telephone ringing signal and engaging the telephone lines;
   a tone decoder for converting a remote control signal transmitted by calling party through said telephone lines;
   said controlling means operated by said tone decoder for switching said selection switches arranged in said remote control unit; and
   disengaging means for detecting an on-hook signal and disengaging said telephone lines from said remote control adapter.

2. A remote control adapter according to claim 1, wherein said electric equipment is controlled by optical energy which is generated by said remote control unit positioned in a suitable location.

3. A remote control adapter according to claim 1, wherein said receiving means includes a socket and said remote control unit plugs into said socket.

4. A remote control adapter according to claim 1, wherein said electric equipment comprises a video tape recorder or a television set.

5. A remote control adapter according to claim 1, wherein said electric equipment is operable in any selection mode, and said remote control adapter includes audio monitoring means for sending an audio signal onto said telephone line according to said selection mode of said electric equipment.

6. A remote control adapter according to claim 1, wherein the remote control signal is transmitted through a pushphone by remote user.

7. A remote control adapter according to claim 2, wherein said electric equipment is operable in any selection mode, and said remote control adapter includes audio monitoring means for sending an audio signal onto said telephone line according to said selection mode of said electric equipment.

8. A remote control adapter according to claim 2, wherein the remote control signal is transmitted through a pushphone by remote user.

* * * * *